(12) United States Patent
Wilhelmsson et al.

(10) Patent No.: US 11,026,173 B2
(45) Date of Patent: *Jun. 1, 2021

(54) WAKE-UP RADIO

(71) Applicant: Telefonaktiebolaget LM Ericsson (publ), Stockholm (SE)

(72) Inventors: Leif Wilhelmsson, Lund (SE); Miguel Lopez, Solna (SE); Thomas Olsson, Karlshamn (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/470,208

(22) PCT Filed: Dec. 14, 2016

(86) PCT No.: PCT/EP2016/080995
§ 371 (c)(1),
(2) Date: Jun. 15, 2019

(87) PCT Pub. No.: WO2018/108264
PCT Pub. Date: Jun. 21, 2018

(65) Prior Publication Data
US 2019/0313338 A1 Oct. 10, 2019

(51) Int. Cl.
*H04W 52/02* (2009.01)
(52) U.S. Cl.
CPC ......... *H04W 52/0229* (2013.01); *Y02D 30/70* (2020.08)
(58) Field of Classification Search
CPC ............. H04W 52/0229; H04L 5/0048; Y02D 70/1242; Y02D 70/1262; Y02D 70/144; Y02D 70/00; Y02D 70/142
See application file for complete search history.

(56) References Cited

U.S. PATENT DOCUMENTS

| 2005/0058102 A1 | 3/2005 | Santhoff et al. |
| 2005/0207383 A1* | 9/2005 | Carsello ................. H04L 12/56 370/342 |

(Continued)

FOREIGN PATENT DOCUMENTS

| CN | 102042030 A | 5/2011 |
| EP | 1988655 A1 | 11/2008 |

(Continued)

OTHER PUBLICATIONS

3GPP: TSG-RAN WG1 #87;R1-1612069; Nov. 14-18, 2016, Reno, Nevada, USA. (Year: 2016).*

(Continued)

*Primary Examiner* — Hassan A Phillips
*Assistant Examiner* — Mohammed S Chowdhury
(74) *Attorney, Agent, or Firm* — Leffler Intellectual Property Law, PLLC (57) ABSTRACT

A wake-up radio unit for a wireless communication device is disclosed, wherein the wireless communication device has a plurality of wireless communication receivers. The wake-up radio unit is adapted to wake up any of the plurality of wireless communication receivers by receiving a wake-up signal, selecting one or more of the plurality of wireless communication receivers based on the wake-up signal, and waking up the selected one or more wireless communication receiver. In some embodiments, wherein each of the plurality of wireless communication receivers is adapted to receive in accordance with respective standard, the wake-up signal may comprise a set of symbols selected from a collection of possible sets of symbols. Each such set of symbols may indicate, at least in part, one or more corresponding standards. Then, the wake-up radio unit may be adapted to select one or more of the plurality of wireless communication receivers based on the wake-up signal by (Continued)

identifying the set of symbols of the received wake-up signal, and selecting the one or more wireless communication receivers adapted to receive in accordance with the one or more corresponding standards indicated by the identified set of symbols. Corresponding arrangement, wireless communication device, method and computer program product are also disclosed.

12 Claims, 3 Drawing Sheets

(56) References Cited

U.S. PATENT DOCUMENTS

| | | | |
|---|---|---|---|
| 2010/0128817 A1* | 5/2010 | Philips | H04B 1/1615 375/316 |
| 2010/0150122 A1 | 6/2010 | Berger et al. | |
| 2014/0051476 A1 | 2/2014 | Chawla et al. | |
| 2014/0211678 A1* | 7/2014 | Jafarian | H04W 52/0229 370/311 |
| 2015/0094014 A1 | 4/2015 | Diamond et al. | |
| 2015/0334650 A1 | 11/2015 | Park | |
| 2016/0050516 A1* | 2/2016 | Visweswara | H04W 52/0225 455/41.2 |
| 2016/0183187 A1* | 6/2016 | Park | H04W 52/0225 370/311 |
| 2016/0234773 A1 | 8/2016 | Choi et al. | |
| 2016/0277994 A1 | 9/2016 | John et al. | |
| 2016/0278013 A1* | 9/2016 | Shellhammer | H04W 52/028 |
| 2017/0332327 A1 | 11/2017 | Fang et al. | |
| 2018/0041959 A1* | 2/2018 | Yang | H04W 52/265 |
| 2018/0115400 A1 | 4/2018 | Nakajima et al. | |
| 2018/0152333 A1* | 5/2018 | Shellhammer | H04W 52/0229 |
| 2019/0191375 A1* | 6/2019 | Cheng | H04W 52/0229 |
| 2019/0191376 A1* | 6/2019 | Kim | H04W 52/0235 |
| 2019/0289549 A1* | 9/2019 | Lim | H04W 84/12 |
| 2019/0349857 A1* | 11/2019 | Kim | H04W 76/27 |
| 2020/0006988 A1* | 1/2020 | Leabman | A61B 8/56 |

FOREIGN PATENT DOCUMENTS

| | | |
|---|---|---|
| JP | 2003169379 A | 6/2003 |
| JP | 2010118855 A | 5/2010 |
| JP | 2012502519 A | 1/2012 |
| JP | 2013162476 A | 8/2013 |
| JP | 2015149640 A | 8/2015 |
| JP | 2015529412 A | 10/2015 |
| JP | 2015530032 A | 10/2015 |
| JP | 2016536844 A | 11/2016 |
| KR | 20150044921 A | 4/2015 |
| WO | 2005069661 A1 | 7/2005 |
| WO | 2008103861 A1 | 8/2008 |
| WO | 2012008823 A1 | 1/2012 |
| WO | 2016081282 A1 | 5/2016 |
| WO | 2016154059 A1 | 9/2016 |

OTHER PUBLICATIONS

IEEE: Wake-up Frame Detection using Correlated Received Signal Strength for On-Demand WiFi Wake-up. Tomoyuki Tani and Hiroyuki Yomo Graduate School of Science and Engineering, Kansai University. IEEE 2014 (Year: 2014).*
PCT International Search Report, dated Aug. 21, 2017, in connection with International Application No. PCT/EP2016/080997, all pages.
PCT Written Opinion, dated Aug. 21, 2017, in connection with International Application No. PCT/EP2016/080997, all pages.
PCT International Search Report, dated Aug. 8, 2017, in connection with International Application No. PCT/EP2016/080995, all pages.
PCT Written Opinion, dated Aug. 8, 2017, in connection with International Application No. PCT/EP2016/080995, all pages.
Korean Office Action dated Jan. 16, 2020 in connection with Korean Application No. 2019-7019009, 7 pages.
English language summary of Korean Office Action dated Jan. 16, 2020 in connection with Korean Application No. 2019-7019009, 3 pages.
Non-Final Office Action dated Aug. 18, 2020 in connection with U.S. Appl. No. 16/470,207, 29 pages.
Chinese Office Action dated Sep. 29, 2020 in connection with Chinese Application No. 2019-531055, 4 pages.
English language translation of Chinese Office Action dated Sep. 29, 2020 in connection with Chinese Application No. 2019-531055, 4 pages.
Japanese Office Action dated Nov. 4, 2020 in connection with Japanese Application No. 2019-531060, 4 pages.
English language translations of Japanese Office Action dated Nov. 4, 2020 in connection with Japanese Application No. 2019-531060, 4 pages.
Notice of Allowance dated Mar. 24, 2021 in connection with U.S. Appl. No. 16/470,207, 26 pages.
R. De Francisco et al. "An Interference Robust Multi-Carrier Wake-up Radio", IEEE WCNC 2011—Phy, 2011, pp. 1265-1270.
J. Blobel et al., "An Architecture for Sender-based Addressing for Selective Sensor Network Wake-Up Recivers", IEEE 2016, 7 pages.

* cited by examiner

WAKE-UP RADIO

TECHNICAL FIELD

The present invention relates generally to the field of wireless communication receivers. More particularly, it relates to a wake-up radio for wireless communication receivers.

BACKGROUND

There are a relatively large number of wireless communication standards targeting Internet-of-Things (IoT), e.g. those developed by Bluetooth SIG (Special Interest Group), IEEE (Institute of Electrical and Electronics Engineers) 802.11, IEEE 802.15, and 3GPP (Third Generation Partnership Project). Therefore, and in other situations, a wireless communication device may comprise several receivers (or transceivers), each relating to different standards or different versions of a standard.

It is often a desire in relation to wireless communication devices to reduce power consumption. The need to reduce power consumption is often particularly pronounced for wireless communication devices in relation to Internet-of-Things (IoT), where the power source may be the device's own energy harvest (e.g. solar) or low energy batteries that are seldom or never charged or replaced, for example.

For many IoT applications, the supported data rates (typically both peak and average values) are low. Thus, a substantial part of the power is consumed not when the IoT device is transmitting or receiving data, but when the device is in a listening mode to determine whether or not there is a signal for which it is the intended receiver. These conditions motivate using wake-up radios (WUR:s). The concept of using a WUR is known in the art as a means to reduce power consumption in wireless communication devices.

A WUR is a circuit, unit or device which has lower power consumption than a main receiver (typically, extremely low power consumption) and whose only purpose is to wake up a main receiver (or transceiver). Hence, a device having a WUR will not need to turn on its main receiver to scan for potential signals (e.g. a data packet) to receive, since the WUR may be used instead. The WUR can detect that there is a signal for the device to receive by detecting a wake-up signature, or wake-up signal (WUS) that is sent in advance of the signal intended for a main receiver of the device. If the WUR determines, based on the WUS, that there is a signal intended for the device, it will wake up the main receiver (and possibly the transmitter) and a communication link can be established for reception of the signal.

Even though the use of wake-up radios for each (or some of the) main receivers of a wireless communication device reduces power consumption, such reduction may not be sufficient. Furthermore, the size and/or the cost of the wireless communication device may also need to be reduced.

Therefore, there is a need for improved wake-up radio solutions for wireless communication devices.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should also be noted that problems, embodiments and advantages described herein may be equally applicable in other scenarios than those described above, namely any scenario where each of a plurality of wireless communication receivers (comprised in a single wireless communication device) is associated with a WUR.

It is an object of some embodiments to solve or mitigate at least some of the above or other disadvantages.

According to a first aspect, this is achieved by a wake-up radio unit for a wireless communication device having a plurality of wireless communication receivers. The wake-up radio unit is adapted to wake up any of the plurality of wireless communication receivers by receiving a wake-up signal, selecting one or more of the plurality of wireless communication receivers based on the wake-up signal, and waking up the selected one or more wireless communication receiver.

The plurality of wireless communication receivers may, for example, consist of two or more wireless communication receivers. Each wireless communication receiver may or may not be part of a wireless communication transceiver which the wake-up radio is adapted to wake up as a whole. The wireless communication device may also comprise other wireless communication receivers (or transceivers) that the wake-up radio unit is not adapted to wake up.

To wake up a receiver may, for example, comprise switching on a power supply to the receiver, cause an antenna signal to be conveyed to the receiver, and/or enabling operation of the receiver.

In some embodiments, each of the plurality of wireless communication receivers may be adapted to receive in accordance with respective standard. The wake-up signal may comprise a set of symbols selected from a collection of possible sets of symbols, wherein each set of symbols indicates, at least in part, one or more corresponding standards.

In such embodiments, the wake-up radio unit may be adapted to select one or more of the plurality of wireless communication receivers based on the wake-up signal by identifying the set of symbols of the received wake-up signal, and selecting the one or more wireless communication receivers adapted to receive in accordance with the one or more corresponding standards indicated by the identified set of symbols.

A standard may, for example, comprise a communication standard (or a version of a communication standard) determined by any of the Bluetooth SIG, the IEEE, and 3GPP. A communication standard is understood to comprise a definition of a standardized communication protocol, including reception and/or transmission.

Each set of symbols may, for example, comprise a symbol sequence. The symbols may be bits. In transmission of the wake-up signal, bits may be indicated using on/off keying (OOK), amplitude shift keying (ASK), or Frequency Shift Keying (FSK), for example.

The wake-up signal may be a particular code word of an error correcting block code, and the set of symbols may be a part of that code word. The collection of possible sets of symbols may be all different symbol sequences that are possible for the part of the code word in the error correcting block code.

Each set of symbols may indicate one or more standards unambiguously. For example, a set of symbols may indicate exactly one standard unambiguously. Alternatively, two or more standards may be indicated by a same set of symbols. Yet alternatively, a set of symbols may be used to indicate that receivers relating to any of two or more standards are to be woken up (and which standards).

According to some embodiments, the wake-up radio unit may be adapted to identify the set of symbols of the received wake-up signal by correlating the received wake-up signal with a possible set of symbols to achieve a correlation metric, and identifying (e.g. by an identifier) the set of symbols of the received wake-up signal as the possible set of symbols if the correlation metric meets a correlation criterion.

The correlation criterion may, for example, comprise the correlation metric being larger than a correlation threshold value, the correlation being the largest correlation metric among a group of correlation metrics relating to different possible sets of symbols, or a combination of these two criteria.

In some embodiments, the wake-up radio unit may comprise exactly one correlator adapted to correlate the received wake-up signal with any of the possible sets of symbols, and circuitry adapted to cause the correlator to alternate (e.g. in a round-robin fashion) between the possible sets of symbols in the collection.

In some embodiments, the wake-up radio unit may comprise one correlator for each of the possible sets of symbols in the collection, each correlator adapted to correlate the received wake-up signal with that possible set of symbols. According to this embodiment, each receiver of the plurality may have a corresponding correlator in the wake-up radio unit.

If more than one wireless communication receiver is adapted to receive in accordance with the one or more corresponding standards indicated by the identified set of symbols, the wake-up radio unit may, in some embodiments, be adapted to select only one (or a subset of, or all of) of those wireless communication receivers. The selection may be based on a likelihood of the identified set of symbols (e.g. largest correlation metric) and/or on a prioritization among the wireless communication receivers.

The wake-up radio unit may, in some embodiments, be adapted to operate in a frequency band used for transmission of wake-up signals of the respective standard for each (or at least some) of the plurality of wireless communication receivers. Such a frequency band may be a pre-defined frequency band.

A second aspect is an arrangement for a wireless communication device having a plurality of wireless communication receivers, the arrangement comprising the wake-up radio unit of the first aspect. The arrangement may further comprise the plurality of wireless communication receivers according to some embodiments. In some embodiments, the arrangement has a less number of wake-up radio units than wireless communication receivers, for example exactly one wake-up radio unit.

A third aspect is a wireless communication device comprising the arrangement according to the second aspect or the wake-up radio unit of the first aspect.

According to a fourth aspect, a method is provided of a wake-up radio unit for a wireless communication device having a plurality of wireless communication receivers, wherein the wake-up radio unit is adapted to wake up any of the plurality of wireless communication receivers.

The method comprises receiving a wake-up signal, selecting one or more of the plurality of wireless communication receivers based on the wake-up signal, and waking up the selected one or more wireless communication receiver.

A fifth aspect is a computer program product comprising a computer readable medium, having thereon a computer program comprising program instructions, the computer program being loadable into a data-processing unit and adapted to cause execution of the method according to the fourth aspect when the computer program is run by the data-processing unit.

In some embodiments, any of the above aspects may additionally have features identical with or corresponding to any of the various features as explained above for any of the other aspects.

An advantage of some embodiments is that decreased power consumption is enabled.

Another advantage of some embodiments is that the size and/or the cost of the wireless communication device may be reduced.

Yet an advantage of some embodiments is that efficient use and implementation of wake-up radios is provided for in multi-standard implementations.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments of a wake-up radio (WUR) unit for multi-standard support will be described. According to some embodiments, a single WUR unit is adapted to support wake-up operation for more than one receiver, wherein the receivers are adapted to receive in accordance with respective standards.

This is achieved by a WUR unit that, according to some embodiments, is able to receive and detect wake-up signals (WUS) relating to more than one standard. Based on detection of WUS (which indicates the standard(s) associated with the WUS), the WUR unit selects which one(s) of the receivers to wake up, while the remaining receivers are left in their respective sleep modes.

Generally, the different receivers need not be associated with different standards, but may differ in some other way indicated by the WUS. The example of different receivers relating to different standards will, however, be used throughout this description without being intended as limiting.

Figure 1:
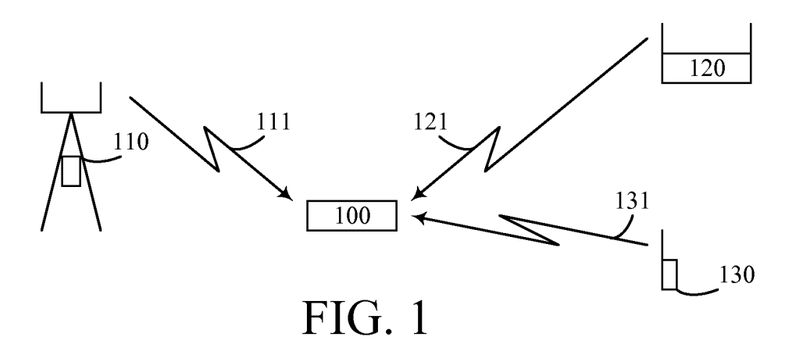
FIG. 1 is a schematic drawing illustrating an example scenario for a multi-standard wireless communication device according to some embodiments.

FIG. 1 schematically illustrates a scenario relevant in relation to some embodiments where a wireless communication device 100 may receive signals (111, 121, 131)

relating to different standards. In the example of FIG. 1, the signal 111 is received from a base station 110 of a cellular communication system (e.g. in accordance with a 3GPP standard, such as UMTS LTE—Universal Mobile Telecommunication Standard, Long Term Evolution), the signal 121 is received from an access point 120 of a wireless local area network system (e.g. in accordance with an IEEE 802.11 standard), and the signal 131 is received from another wireless communication device 130 (e.g. in accordance with a Bluetooth standard, such as Bluetooth Low energy—BLE). To be able to receive these different types of signals, the wireless communication device 100 needs respective corresponding receivers. The power consumption typically increases with the number of receivers of a device and the wake-up radio concept may be used to decrease power consumption as described above.

Figure 2:
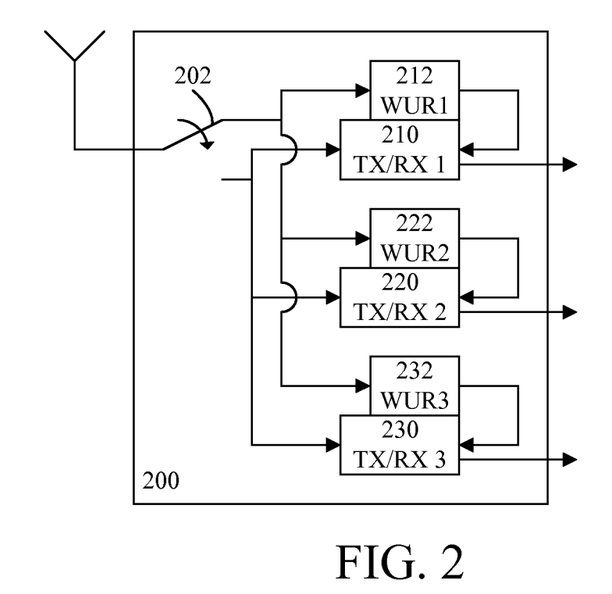
FIG. 2 is a schematic block diagram illustrating an example arrangement of a wake-up radio architecture for a multi-standard wireless communication device.

FIG. 2 schematically illustrates an example arrangement 200 of a wake-up radio architecture for a multi-standard wireless communication device, such as the device 100 of FIG. 1.

The implementation comprises a plurality of transceivers (TX/RX 1, 2, 3) 210, 220, 230 corresponding to reception/transmission in accordance with respective standards. In this example, the three transceivers 210, 220, 230 may, for example, be adapted to receive respective ones of the signals 111, 121, 131 of FIG. 1. For simplicity of illustration a single antenna is assumed to transceiver signals for all of the transceivers.

Each transceiver is associated with a respective wake-up radio unit (WUR 1, 2, 3) 212, 222, 232. Starting in an idle mode, the switch 202 will be in the location indicated in FIG. 2, conveying the antenna signal to each of the wake-up radio units 212, 222, 232, while the transceivers 210, 220, 230 are in respective sleep modes.

When any of the wake-up radio units (say WUR 3, 232) detects a WUS relating to the standard it is monitoring and intended for the wireless communication device, it wakes up its associated transceiver (TX/RX 3, 230) and causes the switch 202 to shift position so that the antenna signal is conveyed to the transceivers instead of the wake-up radio units. Then the woken-up transceiver communicates as standardized until it enters sleep mode again and causes the switch 202 to shift position to the location indicated in FIG. 2.

Even though power is saved using the wake-up radio concept, the architecture of FIG. 2 may be even further streamlined (in terms of, e.g. power consumption, size, and/or cost) as illustrated by embodiments presented herein.

Furthermore, the arrangement of FIG. 2 has the drawback that a WUS intended for one of the transceivers may erroneously (also) wake up another one of the transceivers. If this happens, the power consumption increases. A further problem in this scenario is possible coexistence issues between the standards used by the two transceivers, e.g. if they are operating in the same frequency band.

Figure 3:
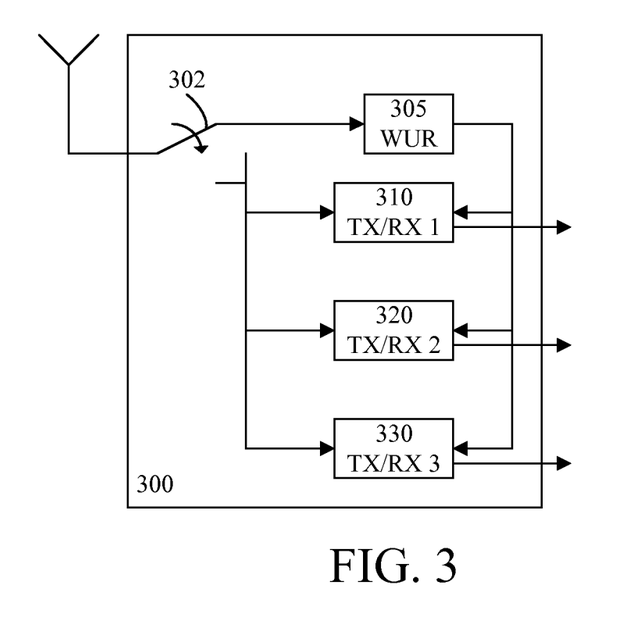
FIG. 3 is a schematic block diagram illustrating an example arrangement of a wake-up radio architecture for a multi-standard wireless communication device according to some embodiments.

Some embodiments are schematically illustrated by the example arrangement 300 in FIG. 3. The arrangement 300 is a wake-up radio architecture for a multi-standard wireless communication device, such as the device 100 of FIG. 1.

The implementation comprises a plurality of transceivers (TX/RX 1, 2, 3) 310, 320, 330 corresponding to a respective reception/transmission standard (compare with 201, 220, 230 of FIG. 2). The three transceivers 310, 320, 330 may, for example, be adapted to receive respective ones of the signals 111, 121, 131 of FIG. 1. For simplicity of illustration a single antenna is assumed to transceiver signals for all of the transceivers.

In contrast to the arrangement of FIG. 2, all of the transceivers 310, 320, 330 are associated with a same wake-up radio unit (WUR) 305. Starting in an idle mode, the switch 302 will be in the location indicated in FIG. 3, conveying the antenna signal to the wake-up radio unit 305, while the transceivers 310, 320, 330 are in respective sleep modes.

The wake-up radio unit 305 monitors the WUS:s of all standards of the corresponding transceivers 310, 320, 330, and when the wake-up radio unit detects a WUS relating to any of those the standards and intended for the wireless communication device, it wakes up the corresponding transceiver (say, TX/RX 3, 330) and causes the switch 302 to shift position so that the antenna signal is conveyed to the transceivers instead of the wake-up radio unit. Then the woken-up transceiver communicates as standardized until it enters sleep mode again and causes the switch 302 to shift position to the location indicated in FIG. 3.

In the examples shown in FIGS. 2 and 3, the same antenna is used for the WUR(s) (212, 222, 232, 305) and the different main transceivers (210, 220, 230, 310, 320, 330), and a switch (202, 302) is used to illustrate whether or not only the WUR(s) are active. This is merely illustrative to emphasize that only the WUR is active until the WUS has been detected, after which one or more of the main transceivers become active. It is to be understood that embodiments are not restricted to the use of a single common antenna, but may also be applicable when, for example, all (or some of) the main transceivers have different antennas (e.g. due to operation in different frequency bands) and/or when a WUR has a separate antenna. The WUR having a separate antenna may, for example, be applicable if the WUS is sent using a frequency which differs (possibly substantially) from the frequencies used by any of the main transceivers for any of the standards supported by the device.

Thus, FIG. 3 illustrates an example arrangement 300 for a wireless communication device, wherein the arrangement comprises a wake-up radio unit 305 and a plurality of wireless communication receivers 310, 320, 330. The wake-up radio unit 305 is adapted to wake up any of the plurality of wireless communication receivers 310, 320, 330 by receiving a wake-up signal, selecting one or more of the plurality of wireless communication receivers 310, 320, 330 based on the wake-up signal, and waking up the selected one or more wireless communication receiver.

To achieve a low probability of error (false alarm and/or missed detection) it may be beneficial to construct the wake-up signal (WUS) based on an error correcting block code, for example. This is because the code words of such a code typically have a mutual distance (e.g. Hamming distance) that is guaranteed to be larger than some minimum distance threshold. Hence, letting the code words represent different WUS vouches for certain error probability characteristics.

In some embodiments, part of the code word (comprising a set of symbols) may be dedicated to indicate which standard the WUS is associated with. Each standard may be associated with a single set of symbols or with a group of sets of symbols. Similarly, each set of symbol may be associated with a single standard or several standards may be associated with the same set of symbols. In some embodiments, the set of symbols have a certain sub-set which indicated whether only one or several (and possibly how many) receivers relating to different standards should be woken up. Thus, the set of symbols indicates, at least in part, one or more corresponding standards. A collection of possible sets of symbols is formed by the corresponding parts of all code words of the code.

The wake-up signal may, alternatively, be constructed in any other suitable way such that it comprises a set of symbols selected from a collection of possible sets of symbols, wherein each set of symbols indicates, at least in part, one or more corresponding standards.

The wake-up radio unit 305 may, thus, be adapted to select one or more of the plurality of wireless communication receivers 310, 320, 330 based on the wake-up signal by identifying the set of symbols of the received wake-up signal, and selecting the one or more wireless communication receivers adapted to receive in accordance with the one or more corresponding standards indicated by the identified set of symbols.

If more than one wireless communication receiver is adapted to receive in accordance with the one or more corresponding standards indicated by the identified set of symbols, the wake-up radio unit may be adapted to select only one, or a subset of, or all of those wireless communication receivers. The selection may be based on a likelihood of the identified set of symbols (e.g. largest correlation metric) and/or on a prioritization among the wireless communication receivers. As mentioned above, there may also be an indication in the WUS as to how many (and possibly which) wireless communication receivers should be selected in such cases.

According to some embodiments, the wake-up radio unit 305 may be adapted to identify the set of symbols of the received wake-up signal by correlating the received wake-up signal with a possible set of symbols to achieve a correlation metric, and identifying the set of symbols of the received wake-up signal as the possible set of symbols if the correlation metric meets a correlation criterion.

The correlation criterion may, for example, comprise the correlation metric being larger than a correlation threshold value, the correlation being the largest correlation metric among a group of correlation metrics relating to different possible sets of symbols, or a combination of these two criteria.

Figure 4:
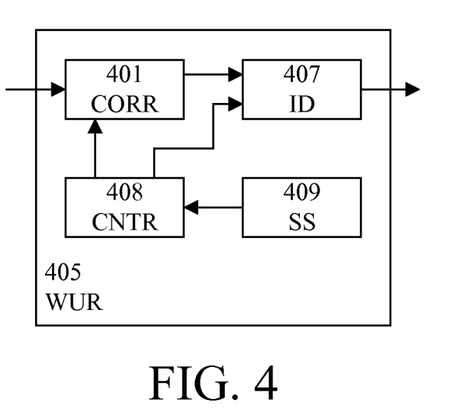
FIG. 4 is a schematic block diagram illustrating an example wake-up radio according to some embodiments.

FIG. 4 illustrates an example wake-up radio unit (WUR) 405 according to some embodiments, which may, for example be used as the WUR 305 of FIG. 3. The WUR 405 comprises exactly one correlator (CORR) 401 adapted to correlate the received wake-up signal with any of the possible sets of symbols, typically stored in a register or other memory unit (SS) 409. The control circuitry (CNTR) 408 is adapted to cause the correlator to alternate between the possible sets of symbols (SS) in the collection to produce corresponding correlation metrics.

An identifier (ID) 407 identifies whether or not the set of symbols in the wake-up signal corresponds to the tested one of the possible set of symbols, for example according to the criteria explained above. The selection of which (if any) wireless communication receiver(s) to wake up may be implemented such that as soon as an identification of the set of symbols in the wake-up signal is achieved by the identifier, the corresponding receiver is woken up. Alternatively, the identification(s)—if any—may be input to a selector (not shown or included in the identifier) for further evaluation (e.g. comparison of correlation metric magnitude(s) and/or prioritization) before final selection.

Figure 5:
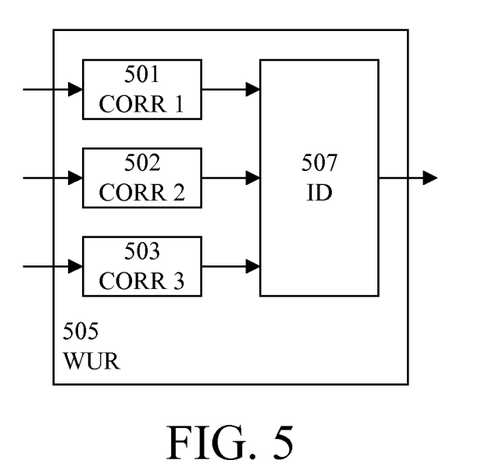
FIG. 5 is a schematic block diagram illustrating an example wake-up radio according to some embodiments.

FIG. 5 also illustrates an example wake-up radio unit (WUR) 505 according to some embodiments, which may, for example be used as the WUR 305 of FIG. 3. The WUR 505 comprises one correlator for each of the possible sets of symbols in the collection (CORR 1, 2, 3) 501, 502, 503, which typically—but not necessarily—means one correlator for each of the receivers. Each correlator is adapted to correlate the received wake-up signal with a dedicated possible set of symbols An identifier (ID) 507 identifies whether or not the set of symbols in the wake-up signal corresponds to any of the tested possible sets of symbols, for example according to the criteria explained above. The selection of which (if any) wireless communication receiver(s) to wake up may be implemented such that all identifications of the sets of symbols in the wake-up signal, result in that the corresponding receiver(s) are woken up. Alternatively, the identification(s)—if any—may be input to a selector (not shown or included in the identifier) for further evaluation (e.g. comparison of correlation metric magnitude(s) and/or prioritization) before final selection.

In some embodiments (that may possibly be combined with any of the embodiments of FIGS. 4 and 5), the WUR may comprise detector, e.g. an envelope detector, followed by one or more correlators. The envelope detector may be used to determine whether or not there is any signal at all present and, if there is a signal present, the correlator(s) may be used to identify which WUS the signal corresponds to. Alternatively, the detector may be used to demodulate a signal being modulated using for example OOK, and followed by a correlator which is used to identify which WUS the signal corresponds to. The output from the detector may be hard (i.e., a single bit) or soft (i.e., also reflecting certainty). Soft information gives better performance at a slightly higher complexity.

Figure 6:
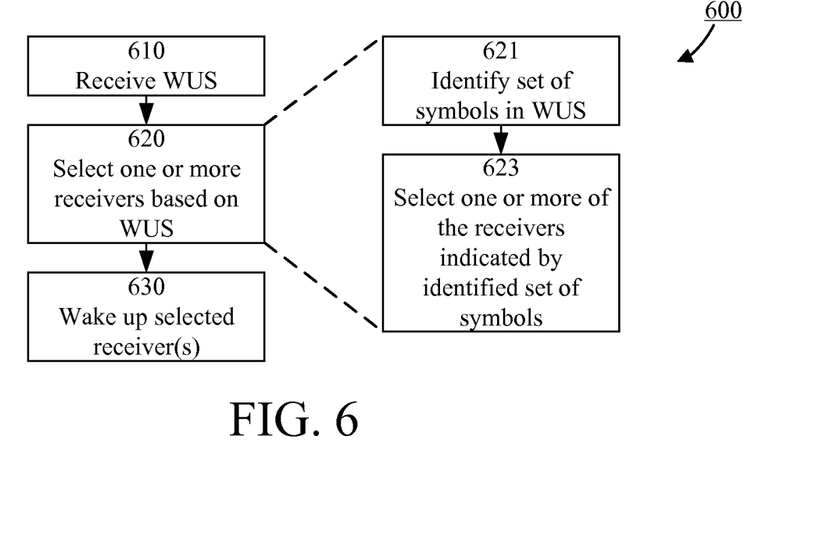
FIG. 6 is a flowchart illustrating example method steps according to some embodiments.

FIG. 6 illustrates an example method 600 according to some embodiments. For example, the method may be performed by any of the wake-up radio units 305, 405, 505 illustrated in connection with FIGS. 3-5. The method is for a wake-up radio unit of a wireless communication device having a plurality of wireless communication receivers, wherein the wake-up radio unit is adapted to wake up any of the plurality of wireless communication receivers.

The method comprises receiving a wake-up signal (step 610), selecting one or more of the plurality of wireless communication receivers based on the wake-up signal (step 620), and waking up the selected one or more wireless communication receiver (step 630).

In correspondence with the explanations above, the step of selecting one or more of the plurality of wireless communication receivers based on the wake-up signal may comprise identifying the set of symbols of the received wake-up signal (step 621) and selecting the one or more wireless communication receivers adapted to receive in accordance with the one or more corresponding standards indicated by the identified set of symbols (step 623).

Other details of the method may be derived from the description of the operation of the arrangements and wake-up radio units of FIG. 3-5.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising arrangements/circuitry/logic or performing methods according to any of the embodiments.

Figure 7:
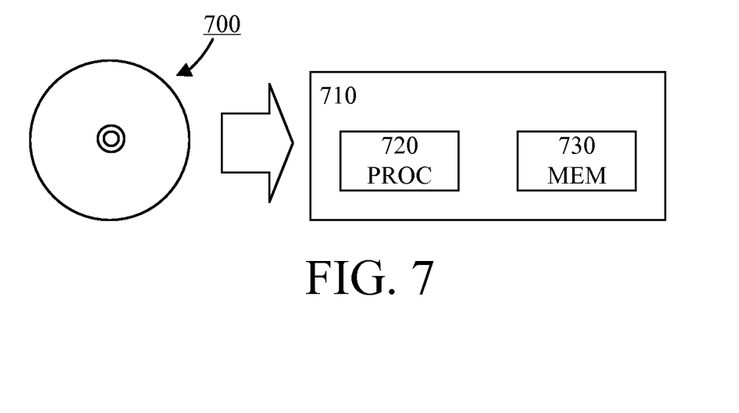
FIG. 7 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 700 illustrated in FIG. 7. The computer readable medium may have stored thereon a computer program comprising program instructions. The computer program may be loadable into a data-processing unit (PROC) 720, which may, for example, be comprised in a wireless communication device 710. When loaded into the data-processing unit, the computer program may be stored in a memory (MEM) 730 associated with or integral to the data-processing unit. According to some embodiments, the computer program may, when loaded into and run by the data-processing unit, cause execution of method steps according to, for example, the method shown in FIG. 6.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A wake-up radio unit comprising:
   circuitry configured to receive any of a plurality of different wake-up signals; and
   circuitry configured to wake up any of a plurality of wireless communication receivers of a wireless communication device by:
   receiving one of the wake-up signals;
   selecting one or more of the plurality of wireless communication receivers based on which wake-up signal was received; and
   waking up the selected one or more wireless communication receivers,
   wherein each of the plurality of wireless communication receivers is adapted to receive in accordance with respective standard, wherein the received wake-up signal comprises a set of symbols selected from a collection of possible sets of symbols, wherein each set of symbols indicates, at least in part, one or more corresponding standards, and wherein the wake-up radio unit is adapted to select one or more of the plurality of wireless communication receivers based on the wake-up signal by:
   identifying the set of symbols of the received wake-up signal; and
   selecting the one or more wireless communication receivers adapted to receive in accordance with the one or more corresponding standards indicated by the identified set of symbols,
   wherein the wake-up radio unit is adapted to identify the set of symbols of the received wake-up signal by:
   correlating the received wake-up signal with a possible set of symbols to achieve a correlation metric; and
   identifying the set of symbols of the received wake-up signal as the possible set of symbols if the correlation metric meets a correlation criterion, and
   wherein the wake-up radio unit comprises:
   exactly one correlator adapted to correlate the received wake-up signal with any of the possible set of symbols; and
   circuitry adapted to cause the correlator to alternate between the possible sets of symbols in the collection.

2. The wake-up radio unit of claim 1, adapted to, if more than one wireless communication receiver is adapted to receive in accordance with the one or more corresponding standards indicated by the identified set of symbols, select only one of those wireless communication receivers.

3. The wake-up radio unit of claim 2, adapted to select the one wireless communication receiver based on a likelihood of the identified set of symbols.

4. The wake-up radio unit of claim 2, adapted to select the one wireless communication receiver based on a prioritization among the wireless communication receivers.

5. The wake-up radio unit of claim 1, wherein the wake-up radio unit is comprised in an arrangement for the wireless communication device.

6. The wake-up radio unit of claim 5, wherein the arrangement further comprises the plurality of wireless communication receivers.

7. The wake-up radio unit of claim 1, wherein the wake-up radio unit is comprised in the wireless communication device.

8. A method of a wake-up radio unit that is configured to receive any of a plurality of different wake-up signals, the method comprising:
   receiving one of the wake-up signals;
   selecting one or more of a plurality of wireless communication receivers of a wireless communication device based on which wake-up signal was received; and
   waking up the selected one or more wireless communication receivers,
   wherein each of the plurality of wireless communication receivers is adapted to receive in accordance with respective standard, wherein the received wake-up signal comprises a set of symbols selected from a collection of possible sets of symbols, wherein each set of symbols indicates, at least in part, one or more corresponding standards, and wherein selecting one or more of the plurality of wireless communication receivers based on the wake-up signal comprises:
   identifying the set of symbols of the received wake-up signal; and
   selecting the one or more wireless communication receivers adapted to receive in accordance with the one or more corresponding standards indicated by the identified set of symbols,
   wherein identifying the set of symbols of the received wake-up signal comprises:

correlating the received wake-up signal with a possible set of symbols to achieve a correlation metric; and identifying the set of symbols of the received wake-up signal as the possible set of symbols if the correlation metric meets a correlation criterion, and wherein correlating the received wake-up signal with the possible set of symbols to achieve the correlation metric comprises:

using exactly one correlator to correlate the received wake-up signal with any of the possible set of symbols; and causing the correlator to alternate between the possible sets of symbols in the collection.

9. The method of claim 8, further comprising:

if more than one wireless communication receiver is adapted to receive in accordance with the one or more corresponding standards indicated by the identified set of symbols, selecting only one of those wireless communication receivers.

10. The method of claim 9, wherein the selection of the one wireless communication receiver is based on a likelihood of the identified set of symbols.

11. The method of claim 9, wherein the selection of the one wireless communication receiver is based on a prioritization among the wireless communication receivers.

12. A non-transitory computer readable medium, having thereon a computer program comprising program instructions, the computer program being loadable into a data-processing unit and adapted to cause execution of a method when the computer program is run by the data-processing unit, wherein the method is for a wake-up radio unit that is configured to receive any of a plurality of different wake-up signals, wherein the method comprises:

receiving one of the wake-up signals;

selecting one or more of a plurality of wireless communication receivers of a wireless communication device based on which wake-up signal was received; and waking up the selected one or more wireless communication receivers, wherein each of the plurality of wireless communication receivers is adapted to receive in accordance with respective standard, wherein the received wake-up signal comprises a set of symbols selected from a collection of possible sets of symbols, wherein each set of symbols indicates, at least in part, one or more corresponding standards, and wherein selecting one or more of the plurality of wireless communication receivers based on the wake-up signal comprises:

identifying the set of symbols of the received wake-up signal; and selecting the one or more wireless communication receivers adapted to receive in accordance with the one or more corresponding standards indicated by the identified set of symbols, wherein identifying the set of symbols of the received wake-up signal comprises:

correlating the received wake-up signal with a possible set of symbols to achieve a correlation metric; and identifying the set of symbols of the received wake-up signal as the possible set of symbols if the correlation metric meets a correlation criterion, and wherein correlating the received wake-up signal with the possible set of symbols to achieve the correlation metric comprises:

using exactly one correlator to correlate the received wake-up signal with any of the possible set of symbols; and causing the correlator to alternate between the possible sets of symbols in the collection.

* * * * *